(No Model.) 2 Sheets—Sheet 1.

W. J. MUNCASTER.
METAL WORKING LATHE.

No. 437,866. Patented Oct. 7, 1890.

Witnesses:
James T. Duhamel
Horace A. Dodge

Inventor:
Walter J. Muncaster,
by Dodge & Sons,
Attys.

(No Model.) 2 Sheets—Sheet 2.

W. J. MUNCASTER.
METAL WORKING LATHE.

No. 437,866. Patented Oct. 7, 1890.

Witnesses:
James F. Duhamel
Horace A. Dodge

Inventor:
Walter J. Muncaster,
by Dodge & Sons,
Attys.

UNITED STATES PATENT OFFICE.

WALTER J. MUNCASTER, OF CUMBERLAND, MARYLAND, ASSIGNOR OF ONE-HALF TO MERWIN McKAIG, OF SAME PLACE.

METAL-WORKING LATHE.

SPECIFICATION forming part of Letters Patent No. 437,866, dated October 7, 1890.

Application filed December 6, 1889. Serial No. 332,774. (No model.)

*To all whom it may concern:*

Be it known that I, WALTER J. MUNCASTER, a citizen of the United States, residing at Cumberland, in the county of Alleghany and State of Maryland, have invented certain new and useful Improvements in Metal-Working Lathes, of which the following is a specification.

My invention relates to lathes for turning shafting.

The object sought is to devise a machine which shall be simple and cheap in construction, which shall require very little attention, and which shall admit of a heavy cut, and consequently of rapid operation with shafts of varying sizes.

Figure 1:
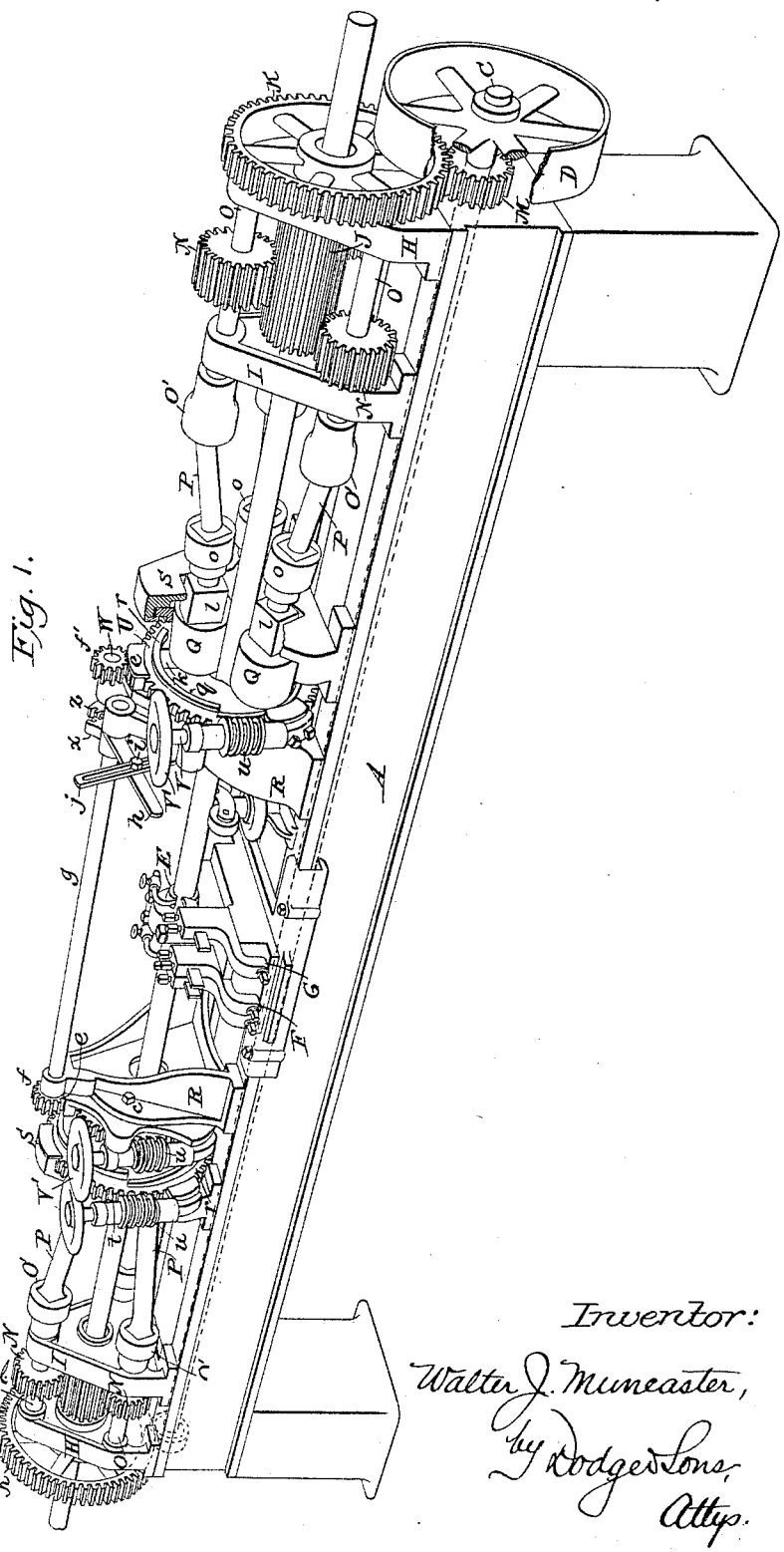
Figure 2:
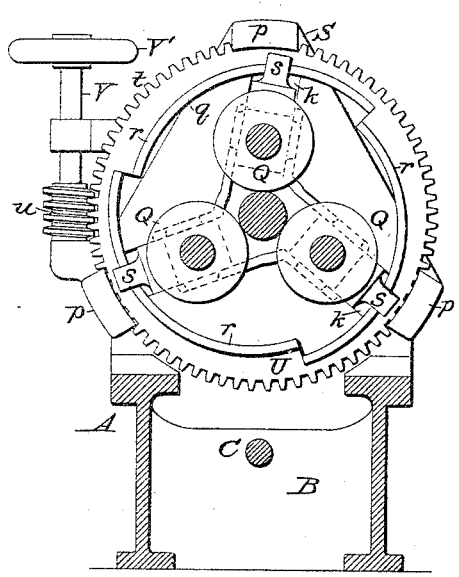
Figure 3:
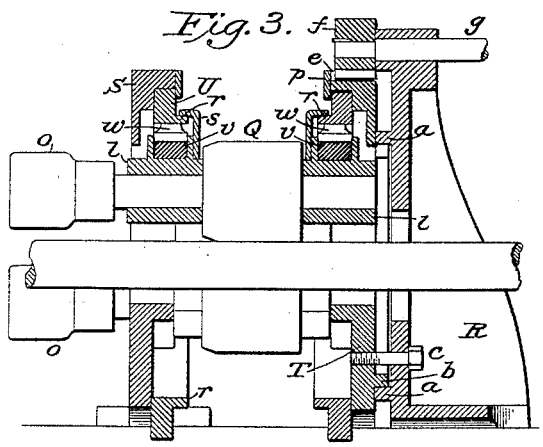
Figure 4:
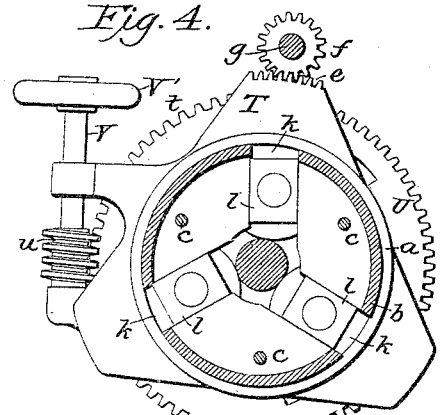
Figure 5:
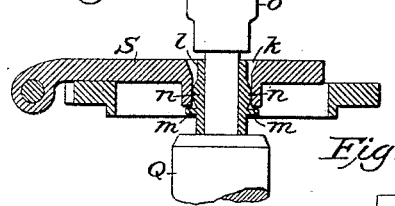
Figure 8:
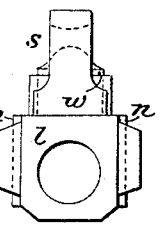
Figure 6:
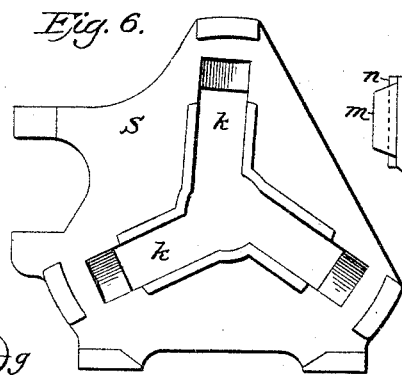
Figure 9:
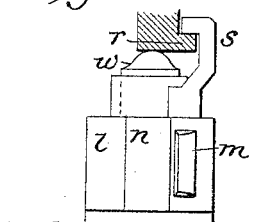
Figure 7:
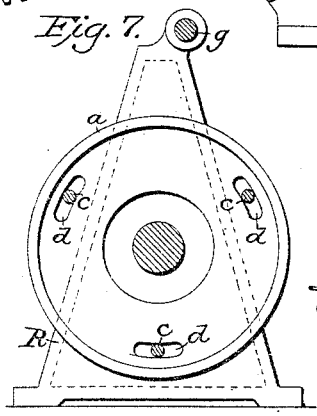
Figure 10:
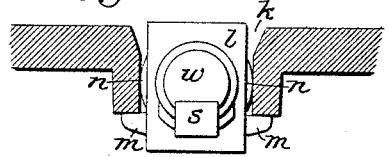

In the drawings, Figure 1 is a perspective view of a machine constructed in accordance with my invention; Fig. 2, a cross-section showing in face elevation the housing in which the feed-roll bearings are supported and guided; Fig. 3, a section through the mechanism for feeding and rotating the shafting in the direction of the travel of the shafting; Fig. 4, a rear face view of an adjustable housing carrying the boxes or bearings for one end of the feed-roll shafts and enabling the obliquity of their axes to be varied according to the feed desired; Fig. 5, a sectional view of one of the boxes or bearings in which the feed-rolls are carried and through the housing in which it moves; Fig. 6, a face view of the housing with the boxes and other parts removed; Fig. 7, a face view of the stock or standard upon which the housing is carried and adjusted; Figs. 8, 9, and 10, detail views of the boxes or bearings in which the feed-roll shafts or journals are carried.

A indicates the bed of the lathe or machine, carried at its ends upon pillars or supports B B, the length of the bed being made sufficient for the convenient handling of ordinary or varied lengths of shafting, as circumstances require.

Extending longitudinally through the open interior of the bed A from end to end and somewhat beyond each end is a shaft C, provided with a band-wheel D, or otherwise adapted to receive motion from any convenient source.

At or about the mid-length of the bed A is a bush E, in which the shaft to be turned is supported and guided during the operation of the cutting-tools F G, which act upon the shafting close to or within the length of the bush. At each side of this bush, or at both ends of the lathe, like mechanism is employed, and the description may be simplified by merely setting out the construction of that at either end, it being kept in mind that the same mechanism is duplicated at the opposite end.

Rising from the bed at its ends are standards or heads H and I, and extending from one to the other of said standards is an elongated gear wheel or pinion J, for which may be substituted, if desired, a tubular shaft having separate pinions at its ends. The elongated pinion shown is, however, preferred for the reason that the pinions to which it gives motion may under such arrangement be placed out of line with each other and the wear distributed over the length of the pinion J, and thereby lessened at any one point. Secured upon the tubular pinion J is a large gear-wheel K, which meshes with and receives motion from a pinion M, secured upon the driving-shaft C, and the pinion J meshes with and rotates three pinions N, each carried by a shaft O, journaled in the standards or heads H I, as shown in Fig. 1.

Each shaft O carries at its inner end a hub or boss O', in the end of which is formed a polygonal socket to receive one end of a coupling-rod P, through which motion is transmitted to one of a set of feed-rolls Q. The pinions N, being of uniform diameter and all meshing with and receiving motion from the one pinion J, rotate at like speed.

Bolted or otherwise made fast upon the bed A at a point between the standards I and the bushing E is a standard R and a housing S, a second housing T being mounted and arranged to turn a limited distance upon the standard R.

As shown in Figs. 1, 3, and 7, the standard R is formed with a central opening and with a circular plate or face, having an annular rim or collar *a* to receive a similar annular rim or collar *b*, formed upon the back of the adjustable housing T and of a diameter to closely fit within the collar *a*, as best shown in Fig. 3, the housing being kept in place by means of bolts *c*, passing through curved slots

*d* in the face-plate of the standard R and screwing into the housing.

The housings S and T are of approximately triangular outline, as shown in Figs. 4 and 6, but cut away at the angles or meeting-points of the sides consecutively with the central openings of the standard R. One of these curved faces is furnished with teeth *e*, as shown in Figs. 1, 3, and 4, to mesh with the teeth of a pinion *f*, carried by a shaft or rod *g*, which extends from one standard R to the other and is journaled in both. The rod or shaft *g* is furnished with a hand-lever *h*, and is held at any desired adjustment by a clamping-bolt *i*, carried by a lever and passing through a slotted bar *j*, hinged to the standard R.

In all respects, except the manner of mounting and supporting the housings S and T, they are alike, each being formed with a central opening of sufficient diameter to admit the largest shaft upon which the machine is to operate, and with three radial slots *k* to receive and guide boxes *l*, in which the journals of the feed-rolls Q are carried. The boxes *l* are each formed with laterally-projecting ears *m m*, which prevent the boxes from being forced back through the slots *k*; but these ears are rounded off on the back, as shown in Figs. 5, 9, and 10, to permit a limited lateral play of the box. To facilitate such lateral play, the body of each box is made with a rounded bearing-rib *n* on each side, as shown in the same figures.

The feed-rolls Q serve both to advance or feed the shafting toward and past the cutting-tools and to rotate it, and in order that that they may do so it is necessary that their axes be arranged obliquely to that of the shaft upon which they act.

It is desirable that the feed of the shafting be the same per inch whether the shaft be large or small, and to attain this result it is necessary to vary the obliquity of the feed-roller axes as the diameters of the shafts under treatment varies. To secure the requisite obliquity of the feed-roll axes, I make the slots *k* of the housings S and T tangential to a small circle struck from the center or axis, about which the rollers are grouped, the slots of one housing being on the opposite side of a given axial plane from those of the other, but the slots of one housing being normally parallel with those of the other, so that merely moving the roller-boxes in or out will not change the obliquity of their axes. If, however, it be desired to have the obliquity varied in and by the act of adjusting the feed-rollers toward and from the common center or line, the slots may be inclined each way from radial lines, one line common to corresponding slots of the two housings. In practice I find it preferable to vary the obliquity of the roller-axis by turning the housing through the medium of the shaft or rod *g* and pinion *f*, as above explained.

Each roll Q has one of its journals extended beyond the housings S toward the head or standard I and furnished with a socket-piece *o* to receive one of the polygonal ends of the coupling-rod P.

The forward end of each of the rolls Q is beveled or rounded off, as shown in Figs. 1 and 3, to facilitate the entrance of the shafting between the rolls, and each roll is made adjustable toward and from a common point or center. For this purpose any common and well-known means of adjusting the roller-boxes may be adopted; but in order to render the adjustment quick, uniform, and easy, and to enable it to be effected without stopping the machinery, I prefer to employ the mechanism illustrated in Figs. 2 and 3. In said figures, U U indicate rings, the circumference of which are true circles, and have bearing against or within overhanging lugs *p* of the housings S and T, respectively—that is to say, there is one ring for each housing. Each ring U is formed with inclines *q* on its inner surface, corresponding in number with the number of the rollers Q employed, and projecting outward from the face of each ring are ribs or flanges *r*, corresponding in form and parallel with the inclines *q*, as indicated in Fig. 2 and 3. The inclines *q* are designed to bear mediately or immediately upon the boxes *l*, in which the journals of the rolls Q are carried to force said boxes inward toward each other. The ribs or flanges *r* engage beneath clips or hooks *s* formed upon or attached to the boxes *l*, and serve to draw said boxes outward upon the backward rotation of the rings.

To facilitate the rotation of the rings U, I form in the circumference of each a series of teeth *t*, and I mount in each housing a stem or shaft V, having a screw or worm *u*, to mesh with and accurately fit the teeth *t*. Each stem V is furnished with a hand-wheel V', by which it may be turned to give motion to the cam-ring.

It is found in practice that shafting as it comes to the lathe is in many instances irregular, not perfectly cylindrical in form, and varying in diameter at different points, or having occasional protuberances. To permit such shafting to pass readily through the feed-rolls without straining the machinery and without interference with the feed, I introduce between the roller-boxes *l* and the inclines *q* elastic blocks, springs, or other yielding bodies *v*, preferably employing for the purpose blocks of rubber seated in recesses in the outer faces of the boxes and retained therein by bearing blocks or followers *w*, upon which the inclines *q* bear. Owing to the confinement of the rubber and to the comparatively firm quality employed, it affords adequate pressure, yet yields sufficiently to avoid injury of the machine.

Upon referring to Fig. 1 it will be observed that the two adjustable housings are nearer the mid-length of the machine than the two fixed ones, or, in other words, that the relative order or arrangement of the housings S and T is reversed at the two ends of the machine. This arrangement, though arbitrarily adopted and preferred, is not a necessary one. When adopted, however, it requires the reversal of the slots $k$ of the housings, or the turning of the adjustable housings in opposite directions when adjustment is made to vary the obliquity of the feed-roll axes. This is because of the adjustment being made at relatively different ends of the two sets of feed-rolls. To secure this reverse movement and to insure simultaneous and equal adjustment of both the adjustable housings T, the shaft $g$ is furnished with a toothed sector $x$, which meshes with a like toothed sector $z$, carried by a short shaft or spindle W, journaled in the standard R, and bearing a pinion $f'$, which meshes with the teeth $e'$ of housing T, so that as the hand-lever $h$ is moved the two housings T T will be turned or moved in reverse directions.

In the drawings I have indicated the direction of travel of the shaft, which is adopted because of the fact that the feed-rolls are beveled only at that end from which the shaft approaches them, and because the cutting-tools are placed in position to operate upon a shaft rotating and traveling as indicated. This of course is optional, and the same machine could be reversed throughout without in any manner changing the principle or the construction of parts.

Supporting-rolls will or may be used at suitable points to steady the shafting and prevent it from springing.

The machine being constructed as above set forth or with such modifications merely as would fall within the province of the mechanic, a bush of proper size is applied thereto and adjusted to a position in axial alignment with the tubular shafts J. The piece of shafting to be turned or dressed is then passed through the shaft J at the receiving end of the machine, having been first turned or dressed for a few inches at one end in another machine, and the feed-rolls Q being opened, the shafting is passed to and entered in the bush E. This done, the feed-rolls Q at the first end are closed down on the shaft and the work begins, the feed-rolls serving both to advance and to rotate the shafting, while the turning-tools, properly adjusted, remain at rest. Before the shafting leaves the feeding-rolls at the receiving end of the machine the forward end thereof enters between the feed-rolls at the delivery end, and is by them advanced and rotated to complete the work, the beveled ends of the feed-rolls enabling the shafting to enter between the rolls without assistance. As one piece of shafting passes through the bushing, by opening the first set of rolls another shaft is passed through the rolls until the end enters the bush. The rolls are then closed, when the shaft immediately begins to rotate and feed forward, and so the work goes on continuously, all necessary adjustments being made while the machinery continues in motion.

It is of course apparent that the minor details of construction admit of variation, that the cam-rings may be provided with circular collars to fit corresponding collars on the housings, that anti-friction rollers may be employed to reduce friction between the parts, that the cam-rings, the housings, or both, may be directly moved by levers, and that the form of standards, housings, &c., may be varied. So, too, the gearing may be modified, and any common mode of imparting like rotation to the several feed-roll shafts may be substituted. These modifications are such as will naturally be made by the practical mechanic, and do not depart from the scope or spirit of my invention.

The gearing and the general construction above set forth are admirably adapted to the purposes of the machine, being simple, cheap, and strong, and are for that reason preferred.

It is found in practice that a machine constructed as above set forth has very great capacity, and that, owing to the fact that the shafting passes through a second set of feeding-rolls after being dressed or turned, a heavier cut can be taken advantageously than could otherwise be done, because said rolls compress or roll down the roughness or tool-marks which appear in the shafting previous to such rolling action. Shafting thus finished presents an appearance very similar to that of cold-rolled shafting, but with the advantage of being perfectly true and free from the longitudinal marks frequently found therein.

I am aware that it is not broadly new to employ in combination with polishing belts or blocks two sets of feed-rolls—one set on either side of the belt or blocks—nor to arrange said rollers obliquely to the line of travel of the article to be polished, so as to both advance and rotate said article, and I do not broadly claim this idea. In the only instance known to me in which oblique rollers have been arranged on both sides of a polishing device said rollers have been made elastic or have been elastically supported, or both, so as to avoid marring or compressing the surface of the stick or rod upon which they were arranged to bear. My invention is distinguishable from such in that the rollers are non-yielding and are located on opposite sides of a cutting-tool, which tool produces a certain degree of roughness, which is removed or rolled down by the pressure of the feed-rolls acting upon the shaft or part turned after it passes the cutting-tool. The combination of such rolls with a cutting-tool therefore involves an action and a result which are not involved in the use of elastic or yielding rolls, nor, in fact, in the use of any feed-rolls not combined with the cutting-tool, as above set forth.

Having thus described my invention, what I claim is—

1. In a lathe, the combination of a suitable bed or frame, a cutting-tool, and feed-rollers on opposite sides of the cutting-tool.

2. In a shafting-lathe, the combination of feeding-rollers at the receiving end thereof, a second set of feeding-rollers at the delivery end, and an intermediate cutting-tool, whereby the shafting is mechanically moved its entire length past the cutting-tool and is subjected to rolling pressure after being acted upon by said tool.

3. In a shafting-lathe, a series of feeding-rolls at the receiving end and a second set of feeding-rolls at the delivery end of said lathe, the rolls of both sets being obliquely arranged, and an intermediate cutting-tool, whereby the shafting is caused both to rotate and to move longitudinally through the lathe and is subjected to rolling pressure after being acted upon by the cutting-tool.

4. In a shafting-lathe, the combination of a set of feeding-rolls at the receiving end, a second set of feeding-rolls at the delivery end, an intermediate bush, and a cutting-tool arranged to act upon the shafting within or close to said bush.

5. In a machine for finishing shafting, a series of obliquely-arranged feeding-rolls grouped about a common line or axis, boxes for the journals of said rolls, housings provided with slots or ways to receive and guide said boxes, and means, substantially such as described, for moving the boxes toward or from the common line or axis.

6. In a machine for finishing shafting, a series of obliquely-arranged feeding-rolls grouped about a common axis, boxes for the journals of said rolls, and housings provided with ways to receive and guide said boxes, one of said housings being adjustable circumferentially about the common axis, whereby the obliquity of the feed-rolls may be varied.

7. In a machine for finishing shafting, a series of feed-rolls arranged about a common line or axis, independent bearings for the journals at each end of said rolls, separate housings to receive the bearings of the repective ends of the rolls, one of said housings being capable of adjustment about said common line or axis, and means, substantially such as described, for thus adjusting said housings, and thereby varying the obliquity of the rolls relatively to the common axis about which they are grouped.

8. In combination with bed or frame A, feed-rolls Q, elongated tubular pinion J, provided with gear-wheel K, shafts O, provided with pinions N, said pinions arranged out of line with each other and meshing with the elongated pinion J, and coupling-rods P, connecting the shafts O with the shafts of the rollers Q.

9. In combination with bed or frame A, feed-rolls Q at opposite ends thereof, a cutting-tool located between the two sets of feed-rolls, tubular pinion J at both ends of the machine, both provided with a gear-wheel K, shafts O, provided with pinions N to mesh with the respective pinions J, coupling-rods P, connecting-shafts O, and rolls Q, and main shaft C, extending from end to end of bed A and provided with pinions M to mesh with and rotate the gear-wheels K.

10. In combination with housings having slots or ways, and with boxes mounted in said slots or ways, feed-rolls extending from the boxes of one housing to those of the other housing, and rotatable rings mounted upon said housings and having inclines to bear upon and move the boxes, whereby the feeding-rolls may be moved toward or from a common center at will.

11. In combination with a housing having slots or ways, feed-rolls, boxes carrying the journals of said feed-rolls mounted and movable in said slots or ways, a rotatable cam-ring mounted upon the housing and bearing upon the boxes, and a worm or screw journaled in one of said parts and meshing with teeth in the other, substantially as and for the purpose set forth.

12. In combination with a standard R, housing T, mounted and adjustable thereon, housing S, facing the housing T, but separated therefrom, and rollers Q, extending from one housing to the other and having their journals supported therein.

13. In combination with fixed housing S and rotatable housing T, rolls Q, having their journals mounted in slots or ways in said housings, and cam-rings U, applied to said housings and arranged to act upon the roll-journals.

14. In combination with a housing having slots or ways, journal-boxes mounted therein and provided with clips or hooks s, and a ring U, encircling the journal-boxes and provided with inclines q to force them inward and ribs or flanges r to draw them outward.

15. In combination with housings having slots k, rollers Q, extending from one housing to the other and provided with journals, and boxes l, seated in the slots k and carrying the roll-journals, the sides of the boxes having rounded bearing-faces, whereby they are permitted to turn laterally in the slots to adapt themselves to varying positions of the rolls.

16. In combination with standards R R and rotatable housings T T, having peripheral teeth, shaft g, provided with pinion f and toothed sector x, and shaft or spindle W, provided with toothed sector z and pinion f'.

17. In combination with a housing having slots or ways, boxes mounted therein, an encircling ring provided with inclines, elastic bodies resting in or upon the boxes, and followers resting at one end upon the elastic bodies and at the other end upon the inclines.

In witness whereof I hereunto set my hand in the presence of two witnesses.

WALTER J. MUNCASTER.

Witnesses:
C. SMITH, Jr.,
F. M. OFFUTT.